(12) United States Patent
Ming

(10) Patent No.: US 11,499,735 B2
(45) Date of Patent: Nov. 15, 2022

(54) ENHANCEMENT FOR THERMOSTAT PROGRAMMABILITY

(71) Applicant: Computime Ltd., New Territories (HK)

(72) Inventor: Cheng Chung Ming, Tsuen Wan (HK)

(73) Assignee: Computime Ltd., New Territories (HK)

( * ) Notice: Subject to any disclaimer, the term of this patent is extended or adjusted under 35 U.S.C. 154(b) by 336 days.

(21) Appl. No.: 16/923,481

(22) Filed: Jul. 8, 2020

(65) Prior Publication Data

US 2022/0010998 A1  Jan. 13, 2022

(51) Int. Cl.
*F24F 11/47* (2018.01)
*F24F 11/00* (2018.01)
(Continued)

(52) U.S. Cl.
CPC .......... *F24F 11/47* (2018.01); *F24F 11/0001* (2013.01); *F24F 11/0008* (2013.01);
(Continued)

(58) Field of Classification Search
CPC .... F24F 11/0001; F24F 11/0008; F24F 11/46; F24F 11/47; F24F 11/49; F24F 11/54;
(Continued)

(56) References Cited

U.S. PATENT DOCUMENTS

2005/0156052 A1*  7/2005  Bartlett ................ F24F 11/0001
                                                          236/49.3
2010/0228805 A1    9/2010  McCoy et al.
(Continued)

FOREIGN PATENT DOCUMENTS

JP       2013089208 A    5/2013
KR   10-2011-0100895 A   9/2011
(Continued)

OTHER PUBLICATIONS

Oct. 6, 2021—(WO) International Search Report and Written Opinion App PCT/US2021/040857.
Oct. 6, 2021—(WO) International Search Report and Written Opinion—App PCT/US2021/040864.

Primary Examiner — Kidest Bahta
(74) *Attorney, Agent, or Firm* — Banner & Witcott, Ltd.

(57) ABSTRACT

A programmable thermostat supports at least one attribute where each different attribute values may support different sets of thermostatic settings. The programmable thermostat may be programmed based on the different attribute values rather than on temperature set points that are traditionally mapped to programmed times. Each set may include settings for a plurality of controlled equipment including a heating/cooling system, fan, ventilator, humidifier, and/or de-humidifier. Each embodiment may support attribute values associated with an occupancy attribute (which is indicative whether or not people are occupying an environmental entity) and/or a scenario attribute (which flexibly maps different thermostatic settings to different scenario attribute values). Stored configuration data about the thermostatic settings may be organized as a tree structure, where the leaves correspond to the thermostatic settings. A programmable thermostat/ventilator controller may also instruct a ventilator system to run during an adjustable pre-occupancy purge time duration before an environmental entity is occupied.

20 Claims, 22 Drawing Sheets

(51) Int. Cl.
  *F24F 11/49*  (2018.01)
  *F24F 11/54*  (2018.01)
  *F24F 11/56*  (2018.01)
  *F24F 11/61*  (2018.01)
  *F24F 11/63*  (2018.01)
  *F24F 11/65*  (2018.01)
  *F24F 12/00*  (2006.01)
  *G05B 19/042*  (2006.01)
  *F24F 120/10*  (2018.01)
  *F24F 120/12*  (2018.01)
  *F24F 140/50*  (2018.01)
  *F24F 140/60*  (2018.01)

(52) U.S. Cl.
  CPC .............. *F24F 11/49* (2018.01); *F24F 11/54* (2018.01); *F24F 11/56* (2018.01); *F24F 11/61* (2018.01); *F24F 11/63* (2018.01); *F24F 11/65* (2018.01); *F24F 12/00* (2013.01); *G05B 19/0426* (2013.01); *F24F 2120/10* (2018.01); *F24F 2120/12* (2018.01); *F24F 2140/50* (2018.01); *F24F 2140/60* (2018.01); *G05B 2219/2614* (2013.01)

(58) Field of Classification Search
  CPC .. F24F 11/56; F24F 11/61; F24F 11/63; F24F 11/64; F24F 11/65; F24F 12/00; F24F 2110/10; F24F 2120/10; F24F 2120/12; F24F 2120/14; F24F 2140/50; F24F 2140/60; G05B 19/042; G05B 19/0426; G05B 2219/2614
  See application file for complete search history.

(56) References Cited

U.S. PATENT DOCUMENTS

| | | |
|---|---|---|
| 2011/0126144 A1 | 5/2011 | Sakaguchi et al. |
| 2011/0186644 A1 | 8/2011 | Yoshii et al. |
| 2012/0196524 A1 | 8/2012 | Williams et al. |
| 2012/0305661 A1 | 12/2012 | Malchiondo et al. |
| 2015/0142180 A1* | 5/2015 | Matsuoka ............ G05B 19/048 700/276 |
| 2016/0161138 A1 | 6/2016 | Fadell et al. |
| 2016/0223214 A1 | 8/2016 | Turner et al. |
| 2018/0281560 A1 | 10/2018 | Dearth et al. |
| 2019/0078803 A1 | 3/2019 | Castillo et al. |
| 2019/0093911 A1 | 3/2019 | Helt et al. |
| 2019/0209806 A1 | 7/2019 | Allen et al. |
| 2020/0116369 A1* | 4/2020 | Schultz ............ G05D 23/1904 |

FOREIGN PATENT DOCUMENTS

| | | |
|---|---|---|
| KR | 20150115389 A | 10/2015 |
| KR | 10-2018-0066300 A | 6/2018 |

* cited by examiner

| Occupancy Value | Set-Temp | Fan Mode | Ventilator Cycle |
|---|---|---|---|
| Home | 68°F | On | High |
| Sleep | 62°F | Auto | Mid |
| Away | 60°F | Auto | Low |

| Program | Time | Temp (H) | Temp (C) | Fan | Ventilator | Humidifier | Dehumidifier |
|---------|---------|----------|----------|------|------------|------------|--------------|
| 1 | 6:00am | 68°F | 78°F | On | High | 50% | 60% |
| 2 | 8:00am | 62°F | 85°F | Auto | Low | 30% | 80% |
| 3 | 4:00pm | 68°F | 78°F | On | High | 50% | 60% |
| 4 | 10:00pm | 62°F | 82°F | Auto | Mid | 50% | 60% |

Figure 9

| Program | Time | Set-Temp | Un-occupancy Offset |
|---------|---------|----------|---------------------|
| 1 | 6:00am | 68°F | 0°F |
| 2 | 8:00am | 65°F | -5°F |
| 3 | 4:00pm | 68°F | -2°F |
| 4 | 10:00pm | 64°F | -2°F |

Figure 10

| Occupancy Value | Fan Mode | Ventilation Cycle | Humidity Setting (Humidifier) | Humidity Setting (De-humidifier) |
|---|---|---|---|---|
| High | On | Long | 50% | 60% |
| Medium | On | Medium | 50% | 60% |
| Low | Auto | Short | 50% | 60% |
| Zero | Auto | Short | 30% | 80% |

Figure 11

| Settings | Values |
|---|---|
| Friendly name | Evening |
| Un-occupancy offset (Heat) | -4°F |
| Un-occupancy offset (Cool) | +2°F |
| Set-temp (Heat) | 68°F |
| Set-temp (Cool) | 78°F |
| Fan (Heat) | Auto |
| Fan (Cool) | On |
| Ventilator | Long cycle |
| Humidity – Humidifier | 50% |
| Humidifier – Dehumidifier | 60% |

| Settings | Values |
|---|---|
| Friendly name | Night |
| Un-occupancy offset (Heat) | -2°F |
| Un-occupancy offset (Cool) | 0°F |
| Set-temp (Heat) | 62°F |
| Set-temp (Cool) | 82°F |
| Fan (Heat) | Auto |
| Fan (Cool) | Auto |
| Ventilator | Short cycle |
| Humidity – Humidifier | 40% |
| Humidifier – Dehumidifier | 60% |

| Settings | Values |
|---|---|
| Friendly name | Party |
| Un-occupancy offset (Heat) | 0°F |
| Un-occupancy offset (Cool) | 0°F |
| Set-temp (Heat) | 68°F |
| Set-temp (Cool) | 78°F |
| Fan (Heat) | On |
| Fan (Cool) | On |
| Ventilator | Long cycle |
| Humidity – Humidifier | 50% |
| Humidifier – Dehumidifier | 60% |

| Settings | Values |
|---|---|
| Friendly name | Vacation |
| Un-occupancy offset (Heat) | 0°F |
| Un-occupancy offset (Cool) | 0°F |
| Set-temp (Heat) | 45°F |
| Set-temp (Cool) | Off |
| Fan (Heat) | Auto |
| Fan (Cool) | Auto |
| Ventilator | Off |
| Humidity – Humidifier | Off |
| Humidifier – Dehumidifier | Off |

| | Monday | | Tuesday | | ... | Saturday | | Sunday | |
|---|---|---|---|---|---|---|---|---|---|
| Program | Time | Scenario | Time | Scenario | | Time | Scenario | Time | Scenario |
| 1 | 6:00am | Morning | 6:00am | Morning | ... | 6:00am | Weekend | 6:00am | Morning |
| 2 | 8:00am | Out | 8:00am | Out | | - | - | 8:00am | Out |
| 3 | 4:00pm | Evening | 4:00pm | Evening | ... | - | - | 12:00pm | Weekend |
| 4 | 10:00pm | Night | 10:00pm | Night | ... | 10:00pm | Night | 10:00pm | Night |

Figure 16

ENHANCEMENT FOR THERMOSTAT PROGRAMMABILITY

TECHNICAL FIELD

Aspects of the disclosure relate to programmable thermostats/controllers for controlling environmental systems including heating/cooling systems, fans, ventilation systems, humidifiers, and de-humidifiers.

BACKGROUND OF THE INVENTION

Heating and cooling losses from a building typically increase as the temperature differential between the inside and outside of the building increases. An objective of programmable thermostats is supporting a reduction of these losses by allowing the temperature difference to be reduced at times when the reduced amount of heating or cooling would not be objectionable. For example, during the cooling season, a programmable thermostat used in a home may be set to allow the temperature in the house to rise during the workday when no one is expected to be at home. It may then be set to turn on the air conditioning before the arrival of occupants, allowing the house to be comfortable upon the arrival of the occupants while still having saved energy that would have been consumed for air conditioning during the peak outdoor temperatures. The reduced cooling required during the day also decreases the demands placed upon the electrical supply grid. Conversely, during the heating season, the programmable thermostat may be set to allow the temperature in the house to drop when the house is unoccupied during the day and also at night after all occupants have gone to bed, re-heating the house prior to the occupants arriving home in the evening or waking up in the morning. Since most people sleep better when a room is cooler and the temperature differential between the interior and exterior of a building would be greatest on a cold winter night, this approach reduces energy losses.

While programmable thermostats may result in a reduction of energy consumption, there may be little or no average energy savings if the programmable thermostat is used incorrectly. For example, programmable thermostats may be difficult for users to program. Any programming enhancements to thermostats that facilitate and customize thermostatic settings would be beneficial to the art.

SUMMARY OF THE INVENTION

A programmable thermostat utilizes at least one attribute, where each different attribute value may support a plurality of sets of thermostatic settings. The programmable thermostat may be programmed to sets of thermostatic settings based on the different attribute values rather than being programmed to traditional temperature set points that are mapped to programmed times. Each thermostatic set may include settings for a plurality of controlled equipment including, but not limited to, a heating/cooling system, fan, ventilator, humidifier, and/or de-humidifier.

An aspect supports attribute values associated with an occupancy attribute (which is indicative whether or not people are occupying an environmental entity) and/or a scenario attribute (which flexibly maps different thermostatic settings to different scenario attribute values).

An aspect provides a programmable thermostat/ventilator controller that instructs a ventilator system to run during an adjustable pre-occupancy purge time duration before an environmental entity is occupied. The adjusted purge time duration may be based on an amount of time that an environmental entity was un-occupied.

With another aspect, a thermostatic apparatus controls an environmental system associated with an environmental entity. The thermostatic apparatus obtains a current time and accesses occupancy attribute information (for example, thermostatic program information) for the current time. When the current occupancy attribute value is different from a previous occupancy attribute value, the programmable thermostat equates the current thermostatic setting to first and second sets of thermostatic settings corresponding to first and second occupancy attribute values, respectively.

With another aspect, a programmable thermostat interacts with an occupancy detector. The occupancy detector generates a signal that is indicative whether an environmental entity (for example, a house) is occupied. The thermostat may extract an occupancy indicator from the signal and override the current occupancy attribute value.

With another aspect, a programmable thermostat may control an environmental system that includes a heating/cooling system, a fan, a ventilator system, a humidifier, and/or a dehumidifier. Occupancy attribute information may include thermostatic configuration data for one or more of the controlled equipment based on the occupancy attribute value.

With another aspect, a ventilator controller determines a pre-occupancy purge run time and activates a controlled ventilator system for the determine time duration before the next occupancy time period. The pre-occupancy purge run time may be dependent on a number of factors include the duration of the non-occupancy time period.

With another aspect, a thermostatic apparatus controls an environmental system associated with an environmental entity. The thermostatic apparatus obtains a current time and accesses scenario attribute information for the current time. When the current scenario attribute value is different from a previous scenario attribute value, the programmable thermostat equates the current thermostatic setting to first and second sets of thermostatic settings corresponding to first and second scenario attribute values, respectively.

With another aspect, thermostatic configuration data includes a current primary attribute value. When the current primary attribute value is indicative of a first primary attribute value, a programmable thermostat current thermostatic settings to a first set of thermostatic settings. When the current primary attribute value is indicative of a second primary attribute value, the programmable thermostat equates the current thermostatic settings to a second set of thermostatic settings.

With another aspect, a programmable thermostat traverses a tree structure that is representative of thermostatic configuration data. The thermostat then obtains thermostatic settings from the leaves of the tree structure.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

FIG. 4 shows an example of associating thermostatic settings with different occupancy attribute values in accordance with an embodiment.

FIG. 9 shows an example of extending the capability of a programmable thermostat in accordance with an embodiment.

FIG. 10 shows an example of adjusting thermostatic settings based on occupancy detection in accordance with an embodiment.

FIG. 11 shows an example for mapping thermostatic settings to a degree of occupancy in accordance with an embodiment.

FIGS. 12-15 show examples for different scenario attribute values in accordance with an embodiment.

FIG. 16 shows an example for programming a thermostat with different scenario attribute values at different programmed times in accordance with an embodiment.

DETAILED DESCRIPTION

According to an aspect of the embodiments, a programmable thermostat enhances and facilitates controlling an environmental system that is associated with an environmental entity such as a house, office building, and so forth.

A programmable thermostat may automatically adjust the temperature setting (set-temp) based on one or more programs. An exemplary setting is shown in Table 1.

TABLE 1

| Time | Set-temp | House Activities |
|---|---|---|
| 6:00am | 68° F. | Warm the house in the morning |

TABLE 1-continued

| Time | Set-temp | House Activities |
|---|---|---|
| 8:00am | 60° F. | Reduce heating when people go to work and the house is un-occupied. |
| 4:00pm | 68° F. | Warm the house when people back to home. |
| 10:00pm | 62° F. | Reduce heating during the bed time. |

The thermostatic program shown in Table 1 instructs a programmable thermostat when to adjust the set-temp to match the activities of the occupants. When people are at home, the set-temp is adjusted to a comfortable level, while lowering it to save energy when people are out to work or go to bed.

With an aspect of the embodiments, activities in a house may be described by three occupancy attribute values (types):

Home: People are at home and active. They want maximum comfortability.

Sleep: People are at home but inactive. A lower equipment operation is preferred, both for energy saving and lower noise level.

Away: People are not at home. The equipment operation can turn to a much lower setting to save energy.

With the knowledge of the occupancy status, several other thermostat functions may be optimized to provide maximum comfortability and energy saving.

While Table 1 shows only a temperature setting being associated with a designated time, embodiments may support other types of thermostatic settings (for example, as shown in FIG. 9) as will be discussed.

Figure 1:
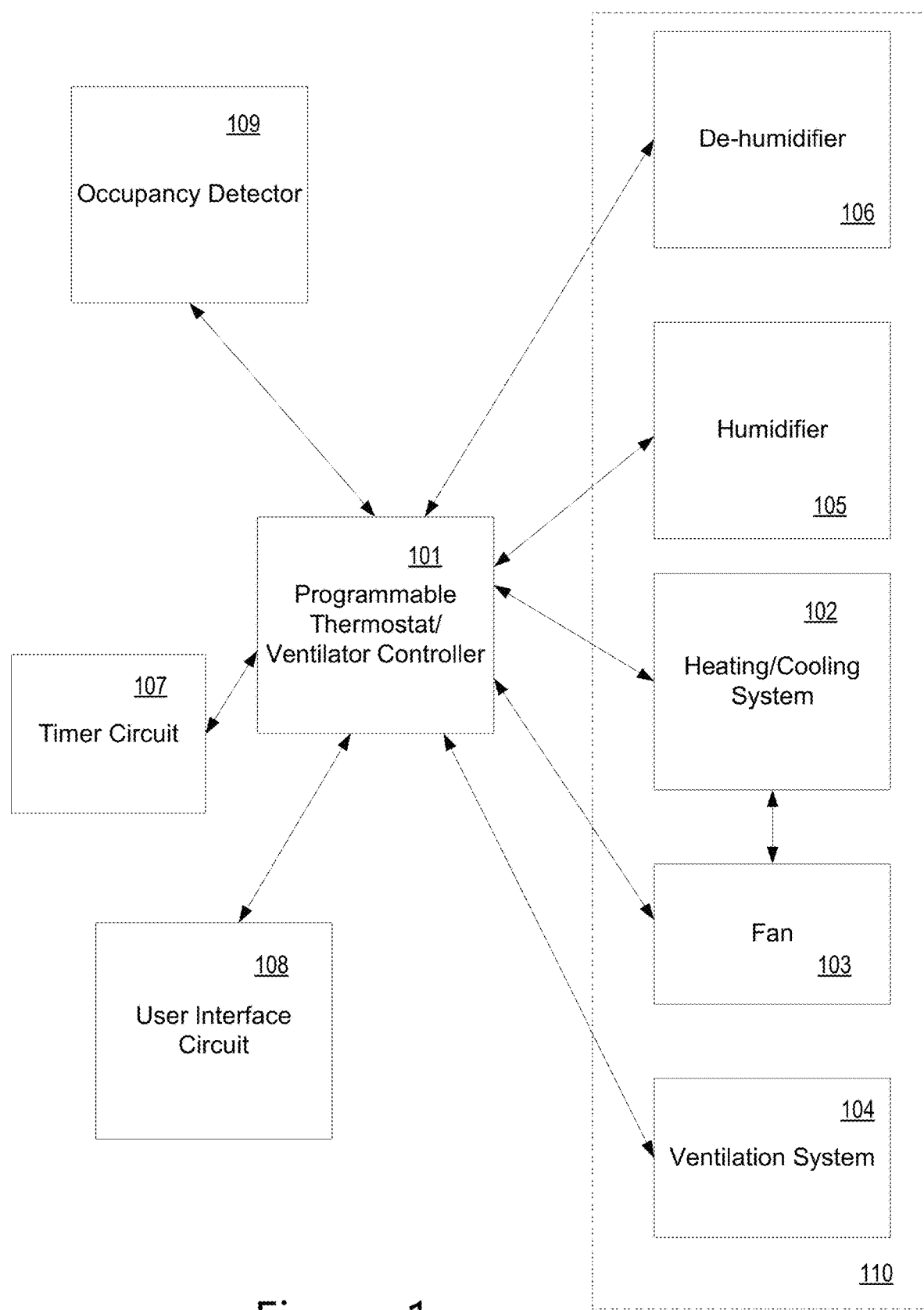
FIG. 1 shows a programmable thermostat interacting with a controlled system in accordance with an embodiment.

FIG. 1 shows programmable thermostat 101 interacting with environmental system 110 in accordance with an embodiment. Environmental system 110 may include various components including, but not limited to, heating/cooling system 102, fan 103, ventilation system 104, humidifier 105, and/or de-humidifier 106. The components may be physically separate or may be combined in some fashion. For example, fan 103 may be physically located within heating/cooling system 102.

In addition, programmable thermostat 101 may interact with timer circuit 107 to obtain a current time so that programmable thermostat 101 may initiate actions of environmental system 110. For example, referring to Table 1, at 6:00 am thermostat 101 may turn on heating/cooling system 102 (for example, a furnace) when a room temperature is below 68° F.

With some embodiments, programmable thermostat 101 may interact with user interface circuit 108 in order for a user to enter thermostatic configuration data for configuring (programming) thermostat 101. For example, the thermostatic configuration data may be representative of what is shown in Table 1.

With some embodiments, occupancy detector 109 may detect whether the environmental entity is occupied or un-occupied and consequently provide a resulting signal to programmable thermostat 101. Thermostat 101 may process the signal and provide thermostatic settings to environmental system 110 based on the signal. For example, thermostat 101 may instruct environmental system 110 to maintain a house (an environmental entity) at a higher temperature when occupied than when un-occupied.

Figure 2:
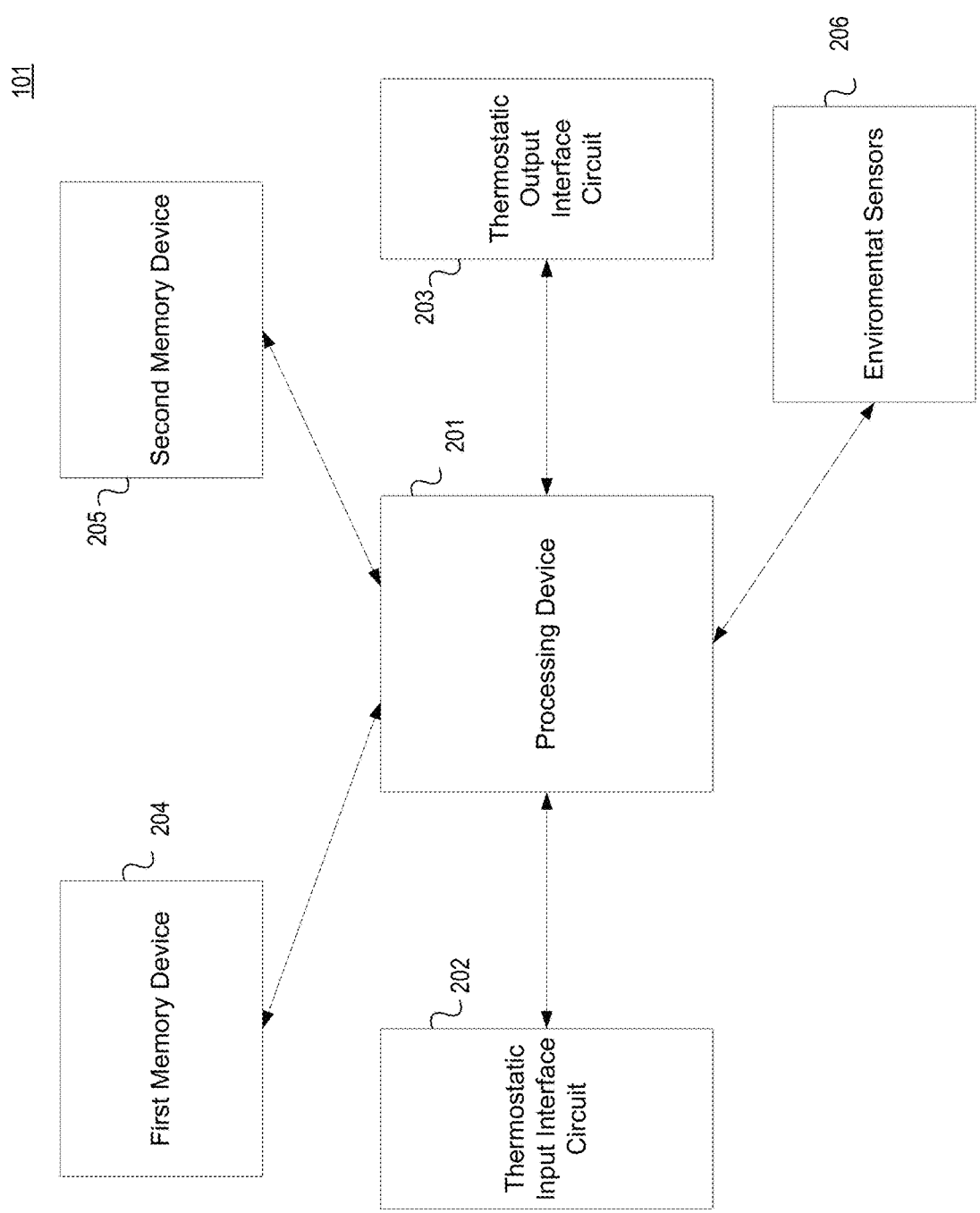
FIG. 2 shows a programmable thermostat in accordance with an embodiment.

FIG. 2 shows programmable thermostat 101 in accordance with an embodiment.

Figure 8:
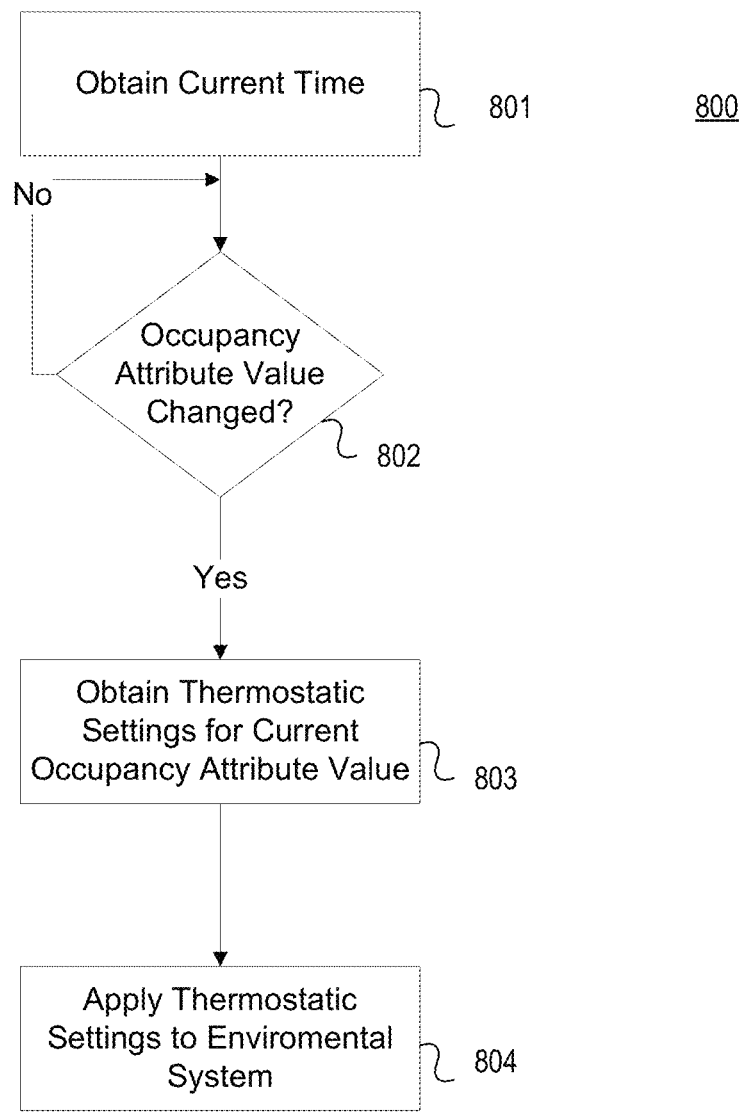
FIG. 8 shows a process for supporting an occupancy attribute by a programmable thermostat in accordance with an embodiment.
Figure 18:
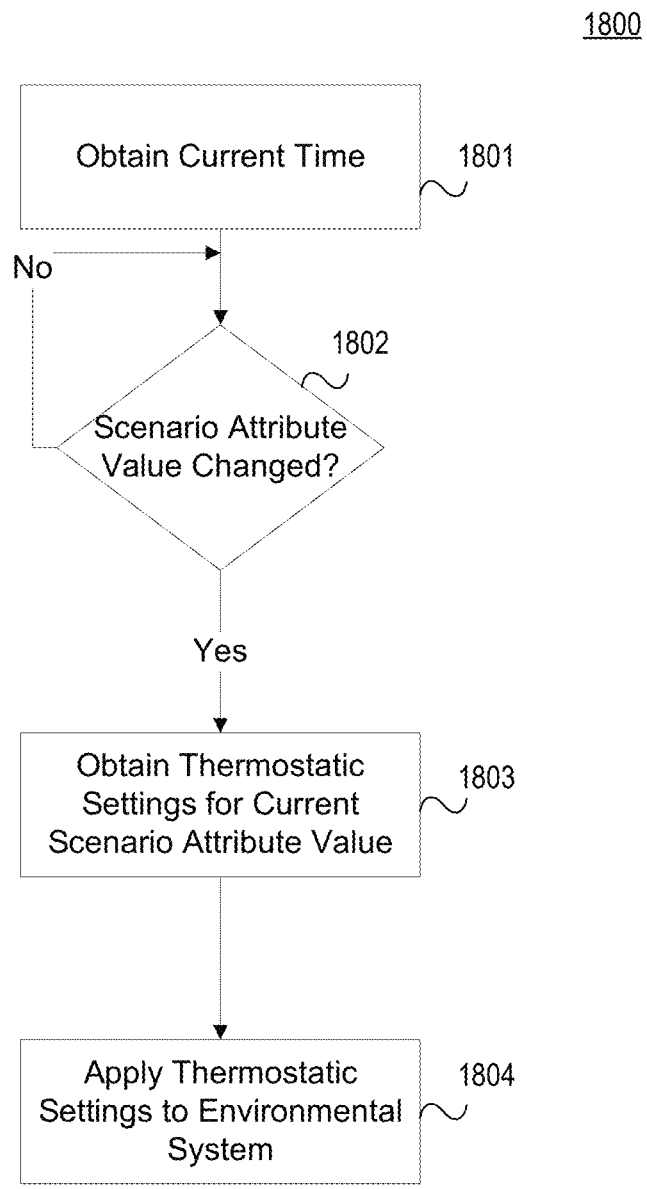
FIG. 18 shows a process for supporting a scenario attribute by a programmable thermostat in accordance with an embodiment.

Processor 201 processes information from environmental sensors 206 and thermostatic configuration data from memory 204 in accordance with computer readable instructions obtained from memory device 205. For example, the computer readable instructions may reflect steps (blocks) in flowchart 800 and/or flowchart 1800 as shown in FIGS. 8 and 18, respectively, as will be discussed. Based on sensor information obtained from environmental sensors 206 and thermostatic settings from memory device 204, processor 201 controls environmental system 110. For example, processor 201 may obtain a room temperature from environmental sensors 206 and instruct heating/cooling system 102 to maintain the room according thermostatic settings as shown in Table 1.

Memory devices 204 and 205 may assume a variety of different computer readable media. Computer readable media may be any available media that may be accessed by computing device and include both volatile and nonvolatile media, removable and non-removable media. By way of example, and not limitation, computer readable media may comprise a combination of computer storage media and communication media.

Computer storage media may include volatile and non-volatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

With some embodiments, memory devices 204 and 205 may be physically implemented with a single memory device.

Once processor 201 obtains the thermostatic settings for environmental system 110, processor 201 may provide the thermostatic settings to thermostatic output interface circuit 203 in order to control environmental system 110. The thermostatic settings may be directly exposed to environmental system 110 or may be used by thermostat 101, in conjunction with signals from environmental sensors 206, to generate control signals to environmental system 110.

Figure 5:
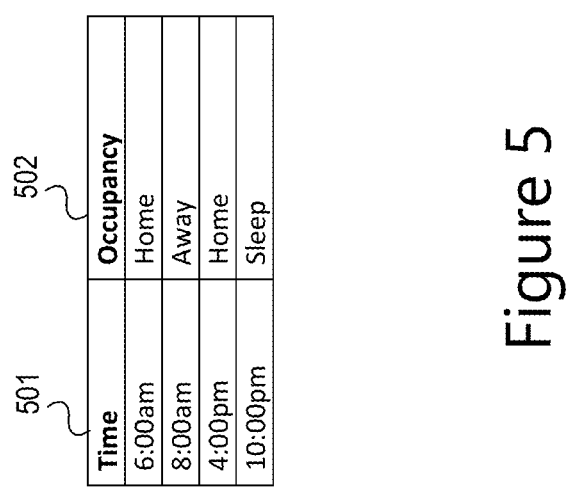
FIG. 5 shows an example of mapping occupancy attribute values with different programmable times for a programmable thermostat in accordance with an embodiment.

Programmable thermostat 101 may also obtain thermostatic configuration data and/or program data through thermostatic input interface circuit 202. For example, a user may configure different thermostatic settings for different attribute values as shown in FIG. 4 and consequently program thermostat 101 based on the different attribute values as shown in FIG. 5.

Figure 3:
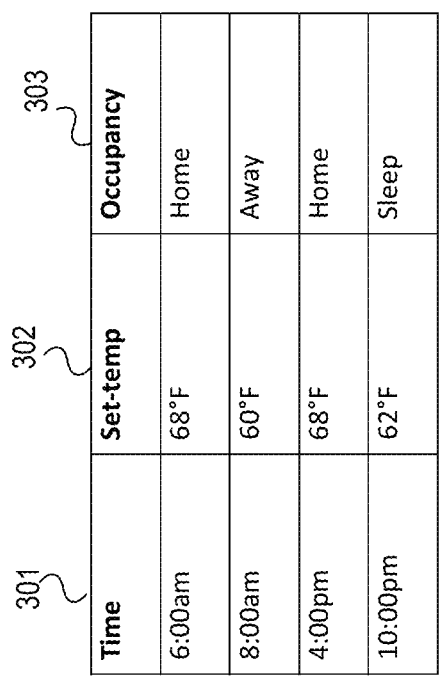
FIG. 3 shows an example of associating an occupancy attribute with different programmed times for a programmable thermostat in accordance with an embodiment.

FIG. 3 shows an example of associating an occupancy attribute with different programmed times for programmable thermostat 101 in accordance with an embodiment.

With some embodiments, an occupancy attribute is included in the programmable information, where the occupancy attribute describes the occupancy status of the house at the program time. Based on the information of the occupancy status as shown in FIG. 3, thermostat 101 may adjust the settings of the thermostat to maximize comfortability and energy saving.

For example, at 6:00 am, in addition to adjusting the set-temp to 68° F., the thermostatic program can provide thermostat 101 that the occupancy type is "Home." Likewise, there may be additional occupancy types of "Away" and "Sleep" assigned for the other thermostatic programs. (Embodiments may include other occupancy types, but "Home," "Sleep," and "Away" are often sufficient to span common situations).

Different settings of thermostat 101 may be associated with the occupancy status. For example, as shown in FIG. 4, the settings of fan mode 403 may be mapped to different occupancy attribute values 401.

For thermostatic programs that have assigned "Home" to the occupancy attribute, the fan may be set to "On" for maximum ventilation. For programs of Sleep and Away, the fan may change to "Auto" to save power and result in lower operation noise.

When ventilator system 104 is equipped, ventilator operation cycle 404 may be adjusted automatically.

When people are not at home, ventilator system 104 may turn to a low setting to save power. With some embodiments, occupancy attribute value 401 may also be mapped to set-temp 402. A user does not need to input the set-temps 402 for each program since each occupancy attribute value 401 is configured for set-temps 402, thus facilitating the programming process. In this approach, the thermostatic program maps set time 501 and occupancy attribute value 502 as shown in FIG. 5.

The occupancy attribute may also support an automatic or manual override. For automatic override, one or several occupancy detection sensors (for example, occupancy detector 109 as shown in FIG. 1) may be used to detect if people are actually at home. Referring to FIG. 5, programmed occupancy values "Home," "Sleep," and "Away" denote that people are at home and active, people are at home but inactive, and the house is unoccupied, respectively. If the detected occupancy by detector 109 does not match the programmed occupancy value, thermostat 101 may perform appropriate changes to the settings for energy savings or increase comfortability. With manual override, a user may manually change the occupancy value from the program preset. With traditional approaches, program overrides (holds) interact only with the set-temp. However, with an aspect of the embodiments, occupancy override collectively changes several settings, thus enabling automatic or manual override of programs to be more flexible and effective.

Figure 6:
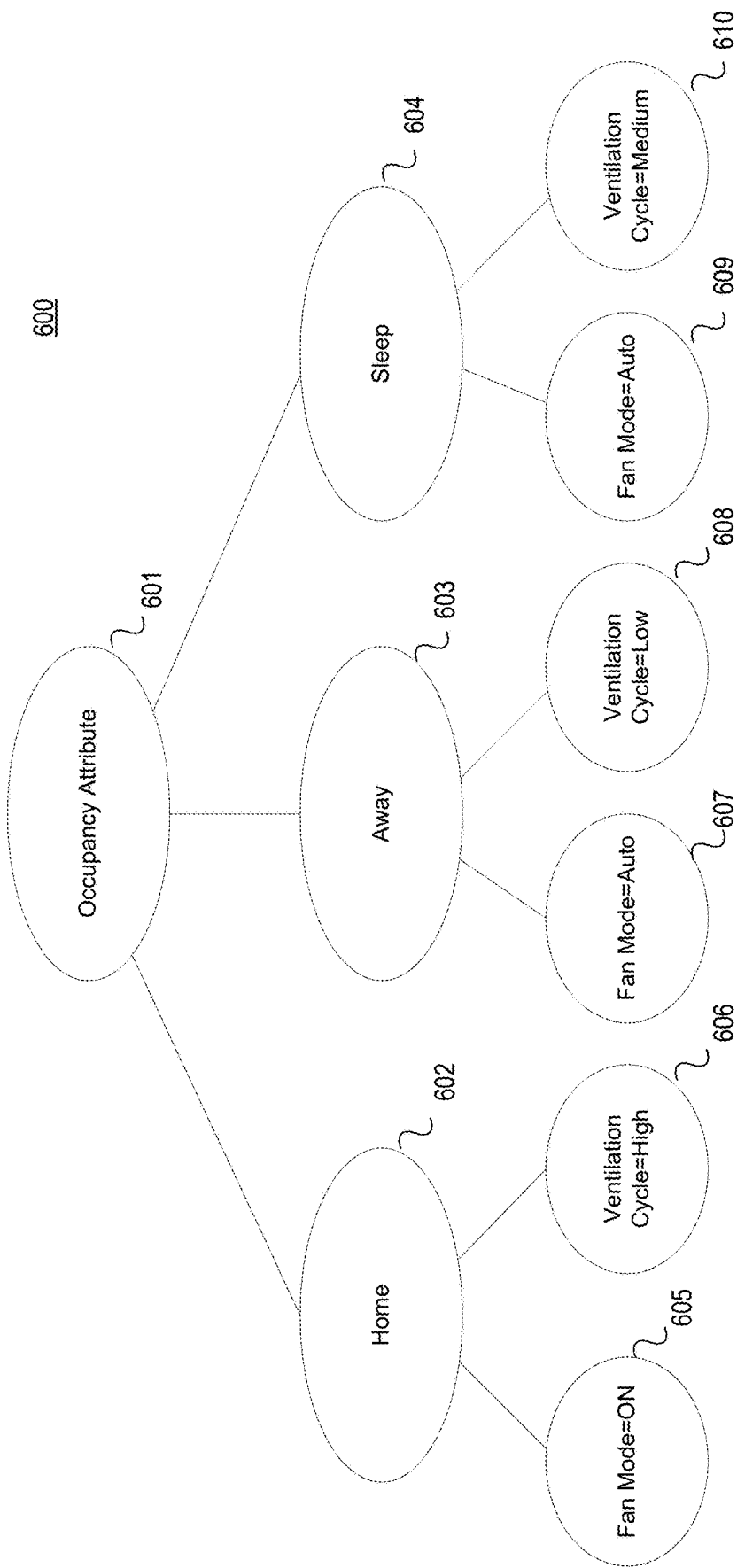
FIG. 6 shows a tree structure for organizing thermostatic configuration data for a programmable thermostat in accordance with an embodiment.

FIG. 6 shows tree structure 600 for organizing thermostatic configuration data for a programmable thermostat in accordance with an embodiment. Tree structure 600 reflects the thermostatic settings shown in FIG. 4. There are three possible occupancy attribute values "Home" 602, "Away" 603, and "Sleep" 604 associated with occupancy attribute 601. Furthermore each occupancy attribute value 602, 603, 604 has associated thermostatic settings 605/606, 607/608, and 609/610, respectively. As shown in FIG. 6, the settings correspond to leaves of tree structure 600, where each leaf does not have any children nodes. Once the thermostatic settings are determined, thermostat 101 is able to provide the determined settings through thermostatic output interface circuit 203.

With some embodiments, processor 201 accesses tree structure from memory device 204 and traverses tree structure based on the selected occupancy attribute value. For example, referring to FIG. 5, the selected occupancy attribute value at 4:00 pm would be "Home" and the associated thermostatic settings would be Fan Mode 605 ("On") and Ventilation Cycle 606 ("High").

Figure 7:
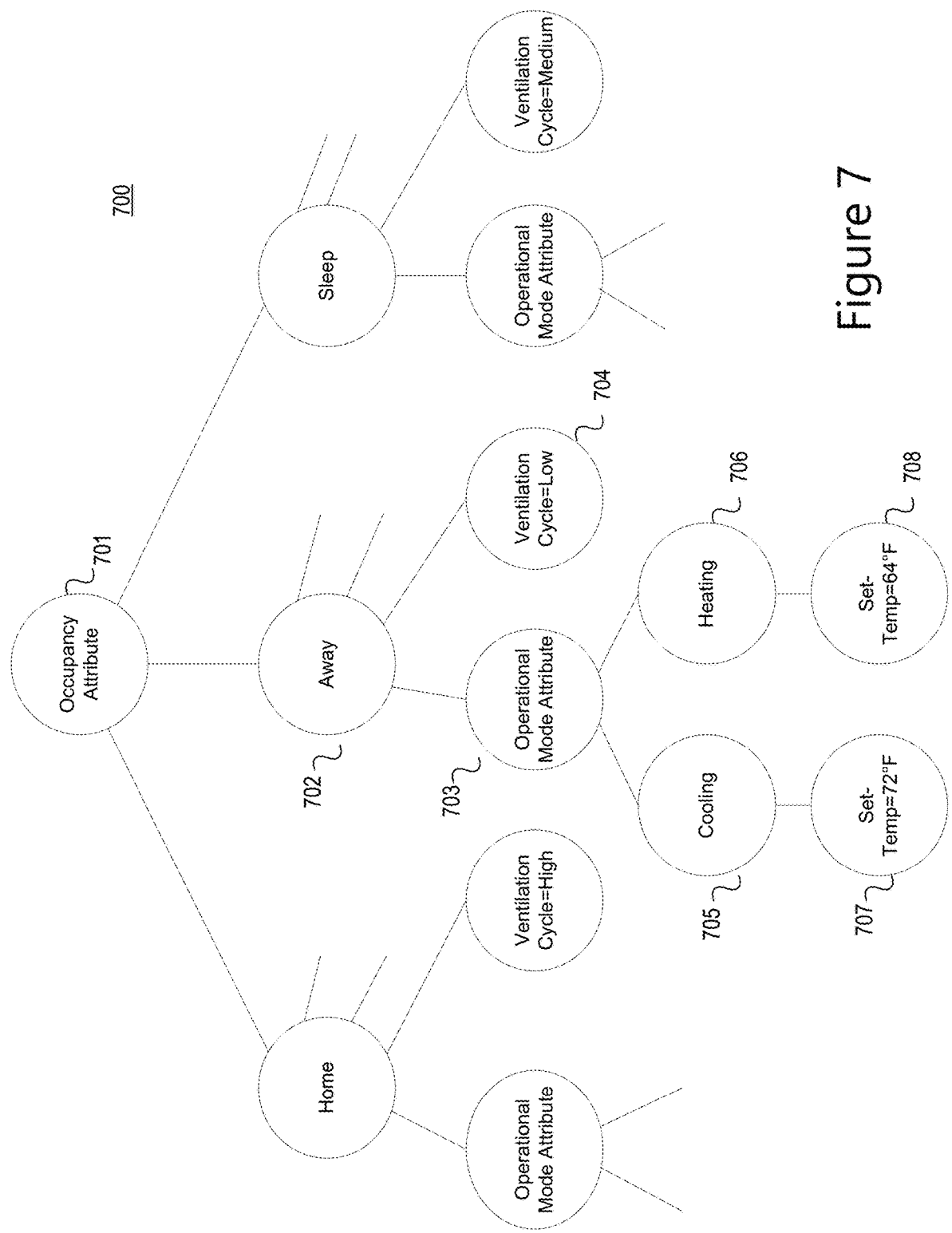
FIG. 7 shows a tree structure for organizing thermostatic configuration data for a programmable thermostat in accordance with an embodiment.

FIG. 7 shows tree structure 700 for organizing thermostatic data for a programmable thermostat in accordance with an embodiment. With this exemplary hierarchical tree structure, additional attributes are associated below each occupancy attribute value. For example, when occupancy attribute 701 has value "Away" 702, operational mode attribute 703 may have value 705 or value 706 corresponding to "Set-Temp=64° F." 707 or "Set-Temp=72° F." 708, respectively, as well as "Ventilation Cycle=Medium" 704. As will be discussed further, occupancy attribute 701 may be termed as a primary attribute while operational mode attribute 703 may be termed as a secondary attribute, FIG. 8 shows process 800 for supporting an occupancy attribute by programmable thermostat 101 in accordance with an embodiment. At block 801, thermostat 101 obtains the current time from timer circuit 107 and determines the corresponding occupancy attribute value at block 802. For example, referring to FIG. 5, when the current time is 4:00 pm, the occupancy attribute value changes from "Away" to "Home."

If the occupancy attribute value changes, as determined at block 802, thermostat 101 obtains thermostatic settings for the current occupancy attribute value at block 803. For example, thermostat 101 accesses a data structure stored at memory device 204 at approximately 4:00 pm to obtain the thermostatic settings associated with occupancy attribute value "Home." Thermostat 101 then applies the thermostatic settings to environmental system 110 at block 804.

FIG. 9 shows example 900 that enhances the capability of programmable thermostat 101 in accordance with an embodiment. With traditional approaches, programmable thermostats may be programmed to change the set-temp at different programmed times in a day to match the living schedule of the occupants. For example, a typical thermostatic program may include four set-point times, denoting that the set-temp changes four times a day.

With an aspect of the embodiment, programmable thermostat 101 may reduce heating or cooling when an environmental entity (for example, house) is un-occupied or at the bed time to reduce energy usage. More controlled thermostatic settings (items) may be added to a thermostatic program to save heating/cooling costs without compromising comfortability to the user.

Referring to FIG. 9, program 901 is extended to include items in addition to set temp values 903 and 904 at programmed time 902. Additional items include, but are not limited to:

Fan Setting 905—Set the fan to "On" when the house is occupied for better air quality, while set to "Auto" when people are not at home or went to bed for energy saving and lower operational noise.

Ventilator Setting 906—Set to "High" when the house is occupied and the occupants are active. Set to "Medium" at the bed time and "Low" when the house is un-occupied.

Humidity controls 907 and 908—Set to a comfort setting when the house is occupied, set to an energy saving setting when people are out.

FIG. 10 shows an example of adjusting thermostatic settings based on occupancy detection in accordance with an embodiment.

With traditional approaches, the set-temp in a thermostat is independent of the environment it controls. For non-programmable thermostats the set-temp is fixed. For programmable thermostat, it is programmed to change the set-temp at different times in a day to match the living schedule of the occupants. However, in either case, the thermostat does not know about the actual conditions of the environment. If the set-temp is set to a comfort setting but people are out of the house, energy is wasted. It is thus desirable if the thermostat knows the actual occupancy condition of the house and does appropriate adjustment to the thermostatic settings based on that information.

Embodiments may utilize different technologies to detect human occupancy by occupancy detector 109 in an environmental entity such as PIR (Passive Infrared), Doppler radar, and computer vision. One or multiple of these occupancy sensors may be installed in the area of interest to detect the existence of human. The sensors return the occupancy status of the area to thermostat 101. Based on the detection, occupancy status may be simply two states of "occupied" and "un-occupied" or multiple states of "high", "medium", "low" and "zero".

With an aspect of the embodiments, energy usage when a house is un-occupied. An additional attribute is added to thermostatic program 1001a-d to inform programmable thermostat 101 to adjust set-temp 1003a-d when the house is un-occupied.

For program 1001a (Program 1), time 1002a (6:00 am) is the wake up time and people are likely to be at home. Offset 1004a is set to zero to prevent wrong triggering.

For program 1001b (Program 2), people are expected to be out for work. The program reduce the set-temp to 65° F. and further reduce it by another 5° F. (corresponding to offset 1004b) when the house is confirmed un-occupied by occupancy detection.

For program 1001c (Program 3), people are back to home from work. The program reset the set-temp to the comfortable 68° F. In the situation when people are not at home at the right time, the occupancy detection inform thermostat 101 to reduce it slightly by 2° F. corresponding to offset 1004c.

For program 1001d (Program 4), time 1002d (10:00 pm) is the bed time. Program 1001d will lower the set-temp to 64° F. and further reduce it for another 2° F. when no activity is detected.

FIG. 11 shows an example of mapping thermostatic settings to a degree of occupancy in accordance with an embodiment.

With an aspect of the embodiments, a change of the fan mode is based on the activities in the home. Fan mode 1102 usually has two settings: "On" and "Auto." When the fan is set to "On," the fan will turn on continuously. When the fan is set to "Auto," the fan will turn on with the equipment. Turning on the fan continuously may help distribute the air in the room more evenly and increase the air quality. Turning on the fan only with the equipment may reduce energy consumption.

With the occupancy detection, a third mode called "Detect" may be added. When large amount of human activities are detected (corresponding to occupancy attribute value 1101 "high" or "medium"), fan mode 1102 is set to "On" mode. When activities are diminished (corresponding occupancy attribute value 1101 "low" or "zero"), fan mode 1102 is changed to "Auto."

Other thermostatic settings include, but are not limited to, the adjustment of the ventilator (ventilation cycle 1103), humidifier operation (humidity setting 1104), and/or de-humidifier operation (de-humidity setting 1105) for maximum comfortability and energy saving based on the activities in an environmental entity.

FIGS. 12-15 show examples for different scenario attribute values for a scenario attribute in accordance with an embodiment.

A modern thermostat may control other equipment as well as a HVAC system, including a fan, ventilator, humidifier, de-humidifier, and so forth.

With traditional approaches, thermostatic program typically support only set-temp but not thermostatic settings for other equipment.

With as an aspect of the embodiments, a manual override may be adjusted in addition to the set-temp.

With an aspect of the embodiments, a scenario attribute value is a collection of thermostat settings. Different scenario attribute values may be defined for programmable thermostat 101, where thermostatic programs may directly refer to one or more different scenario attribute values. A user may also refer to a specific scenario attribute value as an override. Consequently, scenario attribute values may replace set-temps utilized by traditional programmable thermostats.

For example, referring to FIG. 12, scenario attribute value 1200 named "Evening" is configured for a comfortable evening when people are back to home.

Referring to FIG. 13, another scenario attribute value 1300 named "Night" is configured for lower equipment operation for quieter run and energy saving during the bed time.

Other scenario attribute values may be setup as desired.

With an aspect of the embodiments, a user may initiate a specified scenario attribute value in manual override to change several equipment settings in one step. For example, referring to FIG. 14, scenario attribute value 1400 called "Party" is configured for occasions such as a family gathering. The temperature is set to comfort and the ventilation is set to maximum.

By selecting "Party" scenario attribute value 1400 in manual override operation, the user can change several settings at the same time in order to prepare the house for family gathering.

Referring to FIG. 15, "Vacation" scenario attribute value 1500 sets all the equipment to a low operation setting. This collection of settings with one operation can prevent a user from forgetting one piece of the equipment that is left running in a high mode when no people are at home.

With an aspect of the embodiments, thermostatic programs may refer to different scenario attribute values. When different scenario attribute values are defined (for example via a data structure stored in memory device 204), thermostatic programming is facilitated. A user only needs to assign scenario attribute values to designated times in thermostatic programs. By utilizing thermostatic programs, programmable thermostat 101 configures all of the equipment defined for an assigned scenario attribute value when the designated time occurs. FIG. 16 shows an example for programming a thermostat with different scenario attribute values at different programmed times in accordance with an embodiment.

Figure 17:
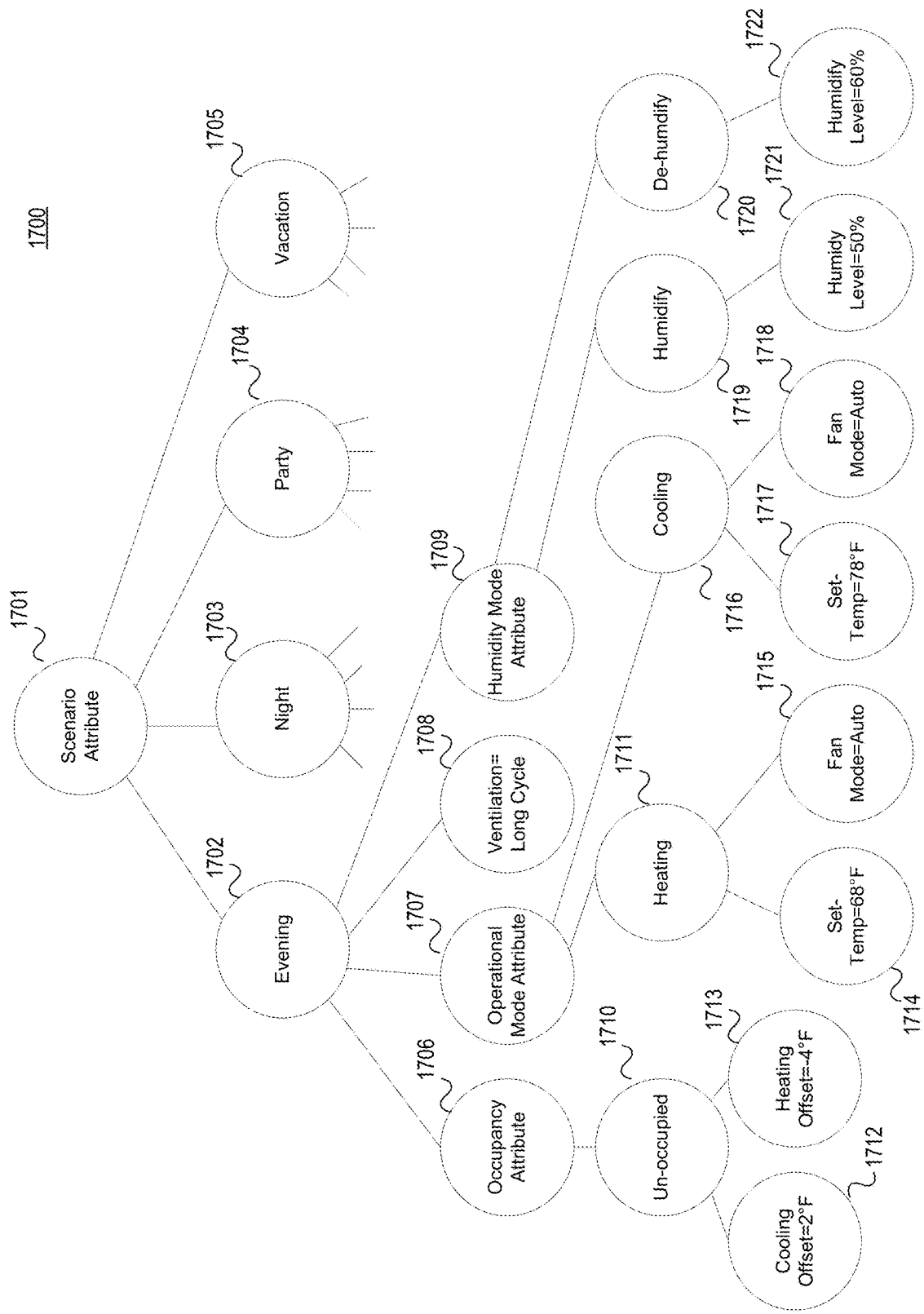
FIG. 17 shows a tree structure for organizing thermostatic data based on scenario attribute values in accordance with an embodiment.

FIG. 17 shows tree structure 1700 for organizing thermostatic configuration data based on scenario attribute values (types) in accordance with an embodiment. For example, configuration data represented as a tree structure may be stored in a memory device (for example, memory device 204). Programmable thermostat 101 subsequently retrieves the configuration data as needed.

Tree structure 1700 represents the thermostatic configuration data shown in FIGS. 12-15, where scenario attribute 1701 may have one of four scenario attributes "Evening" 1702, "Night" 1703, "Party" 1704, and "Vacation" 1705 (which may be referred to as primary attribute values). Attribute values that appear lower in the tree hierarchy (for example, occupancy attribute value 1710) may be termed as secondary attribute values.

Tree structure 1700 shows further branching for Evening 1702 as previously shown in the table at FIG. 12. "Evening" 1702 may be expanded as occupancy attribute 1706, operational mode attribute 1707, ventilation=long cycle 1708 (which may referred to as a leaf), and humidity mode attribute 1709. Because node 1708 may be termed as a leaf, the node provides setting data that is presented to environmental system 110.

Further node layers expand into nodes 1710-1722, where nodes 1712-1715, 1717-1718, and 1721-1722 are leaves and thus correspond to settings when the scenario attribute value is determined to be "Evening" 1702.

One of ordinary skill in the art would appreciate that a tree data structure provides a flexible approach for presenting thermostatic settings applied to an environmental system such as environmental system 110. For example, a primary attribute node may be expanded into secondary attribute nodes and leaf nodes from which a programmable thermostat may apply thermostatic setting to a controlled system.

FIG. 18 shows process 1800 for supporting scenario attribute 1701 by programmable thermostat 101 in accordance with an embodiment. Thermostat 101 obtains thermostatic configuration data (for example, from memory device 204) and applies the appropriate settings to a controlled system (for example, environmental system 110).

Process 1800 supports a scenario attribute by programmable thermostat 101. At block 1801, thermostat 101 obtains the current time from timer circuit 107 and determines the corresponding scenario attribute value at block 1802. For example, referring to FIG. 16, when the current time is 4:00 pm, the scenario attribute value changes from "Out" to "Evening."

If the scenario attribute value changes, as determined at block 1802, thermostat 101 obtains thermostatic settings for the current occupancy attribute value at block 1803. For example, thermostat 101 accesses a data structure stored at memory device 204 at approximately 4:00 pm to obtain the thermostatic settings associated with scenario attribute value "Evening." Thermostat 101 then applies the thermostatic settings to environmental system 110 at block 1804.

Figure 19:
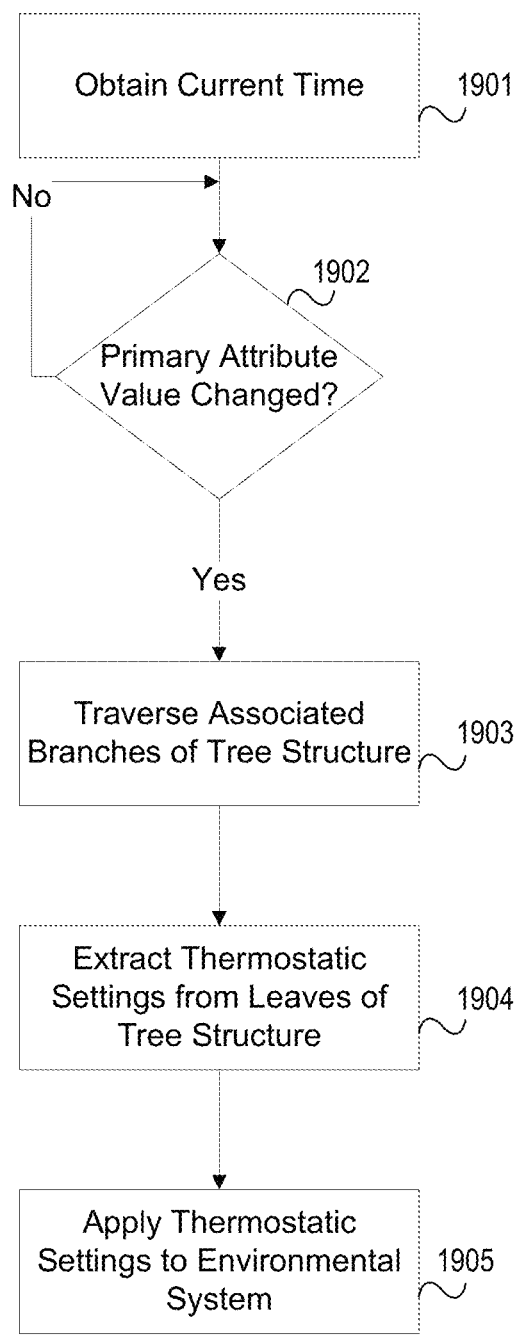
FIG. 19 shows a process for obtaining thermostatic settings from a tree structure in accordance with an embodiment.

With some embodiments, thermostatic configuration data may be represented as a tree data structure (for example, as shown in FIG. 17). FIG. 19 shows process 1900 for obtaining thermostatic settings from a tree structure in accordance with an embodiment.

As with process 1800, thermostat 101 obtains the current time from timer circuit 107 at block 1901 and determines the corresponding primary attribute value (for example, the scenario attribute value) at block 1902.

If the primary attribute value changes, as determined at block 1902, thermostat 101 obtains thermostatic settings for the current primary attribute value at block 1903 by traversing the associated branches of the tree structure.

Thermostat 101 then applies the thermostatic settings to environmental system 110 at block 1905 based on the thermostatic setting information extracted from the leaf nodes obtained at block 1904.

Figure 20:
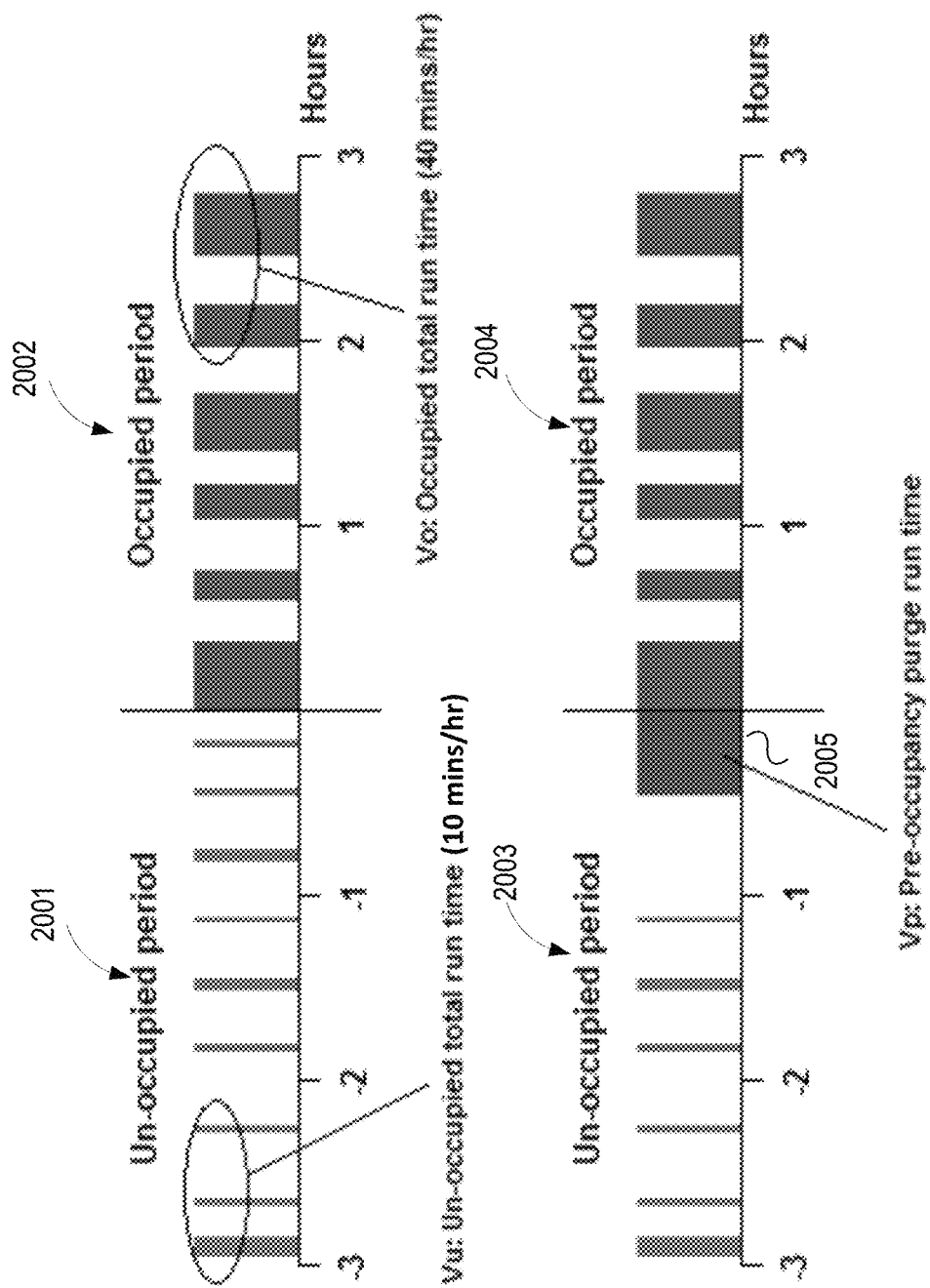
FIG. 20 shows an example of ventilation activity during an unoccupied period and an occupied period in accordance with an embodiment.

FIG. 20 shows an example of ventilation activity during unoccupied periods 2001 and 2003 and occupied periods 2002 and 2004 in accordance with an embodiment.

Ventilator system 104 (as shown in FIG. 1) may be programmed to run sparsely or even turned off to save energy when the house is not occupied and to return to normal running for good air quality when people are at home.

During un-occupied period 2001, ventilator system 104 runs at a low rate so the air quality may become poor. To remove the stale air before people are back at home, according to one aspect of the embodiments, thermostat/ventilator controller 101 may support a pre-occupancy purge feature, which activates ventilator system 104 for a longer period of time at the end of un-occupied period 2003 (corresponding to pre-occupancy purge run time 2005).

With an aspect of the embodiments, a process (such as process 2200 shown in FIG. 22) determines pre-occupancy purge time 2005 based on the following factors:
The longer the time the house is un-occupied, the longer the un-occupancy purge.
The time period of un-occupancy purge is between the ventilation run time for an occupied situation and the ventilation run time for an un-occupied situation.
Denoting:
Tu=Time period of un-occupied in hour
Vo=Ventilation run time of occupied in minutes
Vu=Ventilation run time of un-occupied in minutes
Vp0=Ventilation run time difference
Vp=Time period of purge in minutes
And assuming,
1. If Tu>8, Tu=8
2. If Tu<4, Tu=4
3. d=Vo−Vu
4. If d<0, d=0
5. Vp0=d×Tu/8
6. Vp=Vu+Vp0

The above group of relationships is only an example for determining the purge time. Embodiments may utilize other relationships that are in concert with the conditions discussed above.

With the above example, 8 and 4 hours in (1), (2), and (5) are typical values. Other values may be used for the above approach.

In accordance with an aspect of the embodiments, operation during un-occupied period 2001 (without pre-occupancy purging and may be referred to as the normal mode) may differ from operation during un-occupied period 2003 (with pre-occupancy purging and may be referred to as the purging mode), for example, during the last hour and/or at a different point of time of periods 2001 and 2003 (that is, the pre-occupancy purging period 2005). For periods 2001 and 2003 other than the pre-occupancy purging period 2005, ventilator controller 101 may activate ventilation system 104 only when heating/cooling system (HVAC) 102 is turned on. With this approach, since the fan is typically turned on when HVAC 102 is turned on, extra fan operation is circumvented. For example, in a specific hour, if the HVAC run time is longer than the required ventilation run time (Vo or Vu), ventilator system 104 will be activated within the HVAC on-cycle. If the HVAC run time is shorter than the required ventilation run time, ventilator controller 101 will make up of the required run time at the end of the hour by running only ventilator system 104.

However, during the pre-occupancy purging at time duration 2005, all of the ventilator run time for the last hour of operation is at the end of the un-occupied period 2003 regardless of HVAC operation. For example, when Vp is 40 minutes, then in the last hour of the un-occupied period 2003, the ventilator will not run during the first 20 minutes, but will only run continuously in the last 40 minutes (corresponding to pre-occupancy purge time 2005).

While embodiments may activate purging during the last hour operation as discussed above, some embodiments may activate purging during a different operational time interval, for example, 15 minutes or 2 hours typically at the end of the pre-occupancy period.

Figure 21:
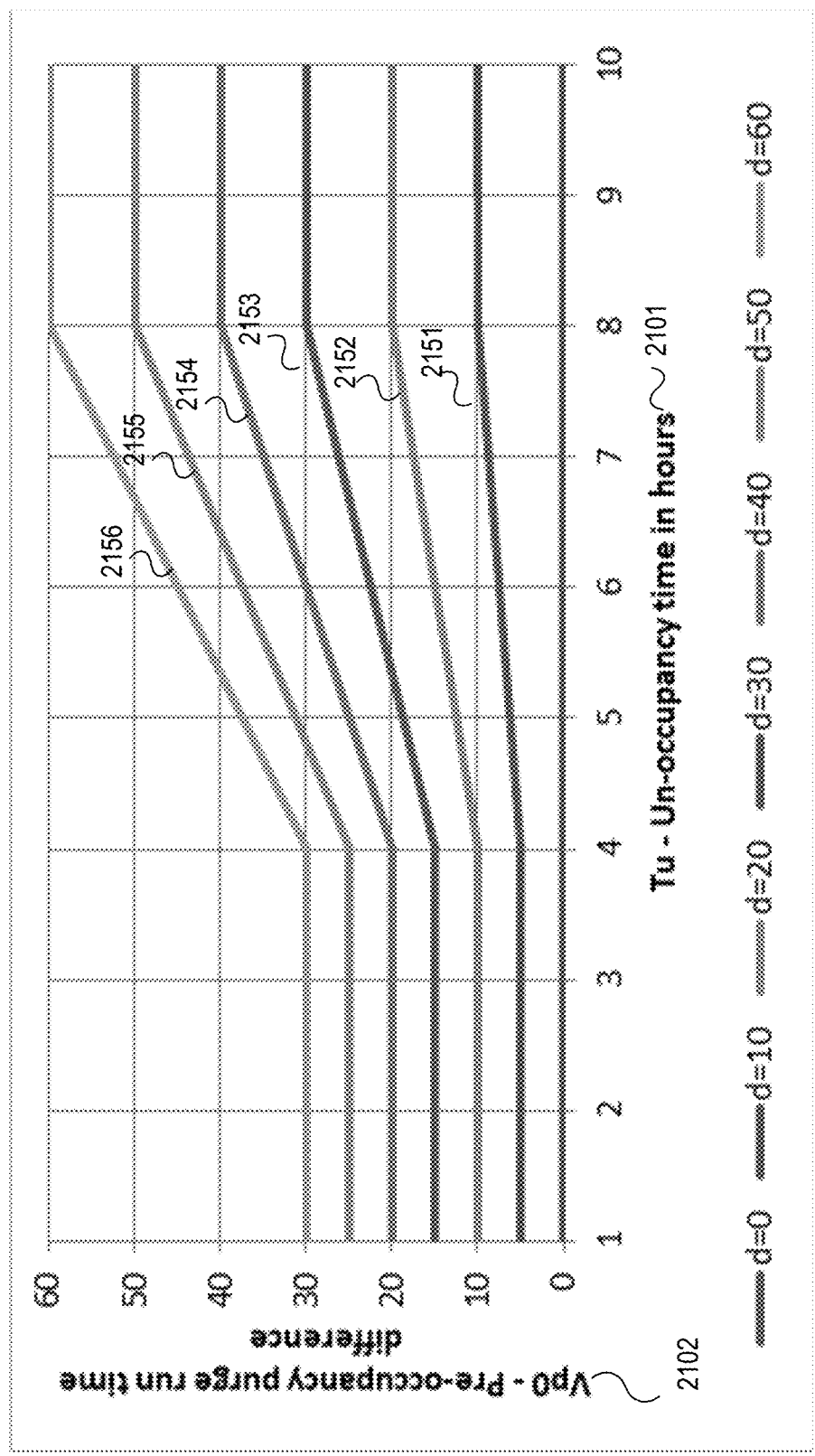
FIG. 21 shows an exemplary relationship between a pre-occupancy purge run time difference (Vp0) and an un-occupancy time in accordance with an embodiment.

FIG. 21 shows an exemplary relationship between a pre-occupancy purge run time difference (Vp0) 2102 and an un-occupancy time 2101 in accordance with an embodiment. Referring to FIG. 21, relationships 2151-2156 (corresponding to d=0, d=10, d=20, d=30, d=40, d=50, and d=60, respectively) show Vp0 for different values of Tu and d. As mentioned above, Tu is the un-occupancy time and d is the difference between ventilation run times in occupied and un-occupied periods, which may be two factors to determine the un-occupancy purge time.

Figure 22:
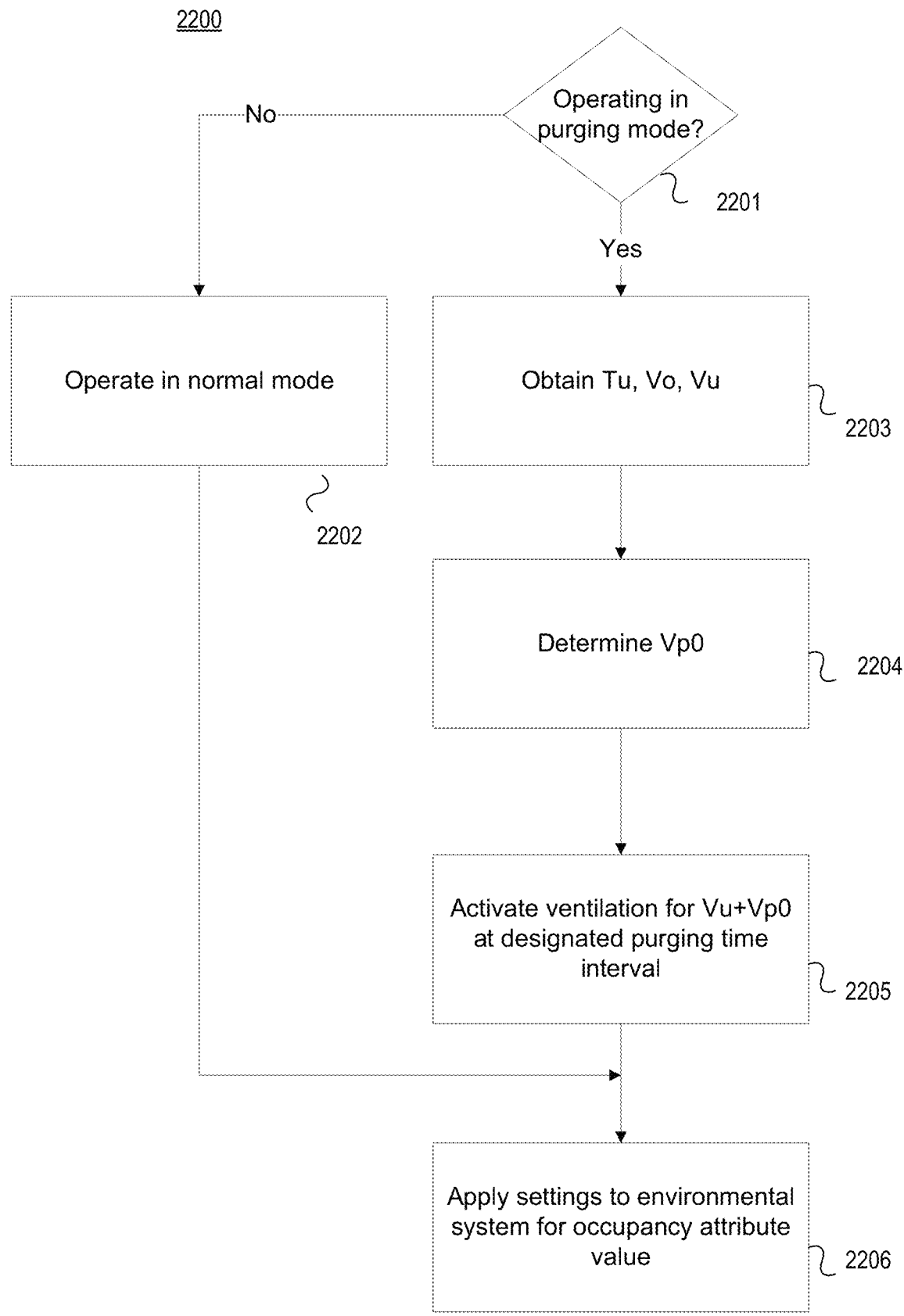
FIG. 22 shows a process for supporting ventilation activity in accordance with an embodiment.

FIG. 22 shows process 2200 for supporting ventilation activity in accordance with an embodiment.

At block 2201 thermostat/ventilator controller 101 determines whether ventilation system 104 is operating in a purging mode rather than a normal mode (non-purging mode). With some embodiments, ventilation system 104 is activated for a required ventilation run time (Vu) throughout un-occupancy period 2001 when heating/cooling system 102 is running if possible. When in the purging mode, ventilation system 104 is activated for an additional time (designated as Vp0 and referred to the pre-occupancy purge run time difference as shown in FIG. 21) during a purging time interval. For example, as shown in FIG. 20, the purging time interval occurs during interval 2005 with a duration of Vu+Vpo at the end of un-occupied period 2003. However, while not explicitly shown, the purging time interval may occur at a different point of time (for example, not exactly at the end).

With some embodiments, thermostat/ventilator controller 101 may determine whether ventilation system 104 is operating in the normal mode or the purging mode from thermostatic configuration data obtained from memory device 204 or from input data obtained through user interface circuit 108.

Referring back to FIG. 22, if thermostat/ventilator controller 101 determines that ventilator system 104 is operating in the normal mode, then process 2200 continues at block 2202. Otherwise. Process 2200 continues at block 2203, where thermostat/ventilator controller 101 obtains Tu, Vo, and Vu, and determines Vpo based on the above relationships at block 2204.

At block 2205, thermostat/ventilator controller 101 activates ventilation during a designated purging time interval (for example, pre-occupancy purge time 2005 as shown in FIG. 20).

Once the un-occupancy time period expires, thermostat/ventilator controller 101 applies the thermostatic settings for occupancy time period 2202 or 2004 at block 2206.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

What is claimed is:

1. A thermostatic apparatus controlling a ventilation system, the thermostatic apparatus comprising:
a timer circuit; and
a ventilator controller comprising:
a memory configured to store thermostatic configuration data comprising at least a first time duration of an un-occupancy time period and a second time duration for a next occupancy time period wherein the ventilator controller is programmed to perform:
determining from a mode indicator that a current operational mode of the ventilation system includes a purging mode;
determining that the ventilation system is operating during an un-occupancy time period; and
in response to the first and second determining:
accessing the thermostatic configuration data comprising the first time duration of the un-occupancy time period and the second time duration for the next occupancy time period;
determining a pre-occupancy purge run time based on a difference between an occupancy ventilation run time and an un-occupancy ventilation run time and based on the first time duration of the un-occupancy time period; and
when the timer circuit is indicative of a beginning of a purging time interval during the un-occupancy time period, causing to activate the ventilation system for the pre-occupancy purge run time.

2. The thermostatic apparatus of claim 1, wherein the ventilator controller is programmed to perform:
combining the pre-occupancy purge run time difference to the un-occupancy ventilation run time to obtain the pre-occupancy purge run time.

3. The thermostatic apparatus of claim 1, wherein the purging time interval occurs at an end of the un-occupancy time period.

4. The thermostatic apparatus of claim 1, wherein the ventilator controller is programmed to perform:
obtaining the mode indicator from the thermostatic configuration data.

5. The thermostatic apparatus of claim 1, wherein the thermostatic apparatus further comprises a user interface circuit and wherein the ventilator controller is programmed to perform:
obtaining the mode indicator through the user interface circuit.

6. The thermostatic apparatus of claim 1, wherein the ventilator controller is programmed to perform:
when the current operational mode is a normal mode and when the ventilator system is operating during the un-occupancy time period, activating the ventilation system for an un-occupancy ventilation run time while a controlled heating/cooling system is running.

7. The thermostatic apparatus of claim 6, wherein the ventilator controller is programmed to perform:
when the un-occupancy ventilation run time is greater that a heating/cooling run time, activating the ventilation system for a remainder to the un-occupancy ventilation run time at an end of the un-occupancy time period.

8. The thermostatic apparatus of claim 1, wherein the ventilator controller is programmed to perform:
when the first time duration of the un-occupancy time period is greater than a first predetermined time duration, the determining comprises equating the first time duration of the un-occupancy time period to a first time constant.

9. The thermostatic apparatus of claim 1, wherein the ventilator controller is programmed to perform:
when the first time duration of the un-occupancy time period is less than a second predetermined time duration, the determining comprises equating the first time duration of the un-occupancy time period to a second time constant.

10. The thermostatic apparatus of claim 1, wherein the ventilator controller is programmed to perform:
when the un-occupancy time period expires, applying thermostatic settings for the next occupancy time period.

11. The thermostatic apparatus of claim 2, wherein the pre-occupancy purge run time increases with the first time duration of the un-occupancy time period and the pre-occupancy purge run time is between the occupancy ventilation run time and the un-occupancy ventilation run time.

12. One or more non-transitory computer-readable media storing computer-readable instructions that, when executed by a computer system, cause the computer system to:
access thermostatic configuration data comprising a first time duration of an un-occupancy time period;
determine a pre-occupancy purge run time difference based on a difference between an occupancy ventilation run time and an un-occupancy ventilation run time and based on the first time duration of the un-occupancy time period;
combine the pre-occupancy purge run time difference to the un-occupancy ventilation run time to obtain a pre-occupancy purge run time; and
activate a ventilation system for the pre-occupancy purge run time at an end of the un-occupancy time period.

13. The one or more non-transitory computer-readable media of claim 12 storing computer-readable instructions that, when executed by the computer system cause the computer system to:
increase the pre-occupancy purge run time with the first time duration of the un-occupancy time period; and
adjust the pre-occupancy purge run time to be between the occupancy ventilation run time and the un-occupancy ventilation run time.

14. The one or more non-transitory computer-readable media of claim 12 storing computer-readable instructions that, when executed by the computer system cause the computer system to:
when the first time duration of the un-occupancy time period is greater than a first predetermined time duration, the determining comprises equating the first time duration of the un-occupancy time period to a first time constant; and
when the first time duration of the un-occupancy time period is less than a second predetermined time duration, the determining comprises equating the first time duration of the un-occupancy time period to a second time constant.

15. A method for controlling a ventilator system in an environmental entity, the method comprising:
determining from a mode indicator that a current operational mode of the ventilation system includes a purging mode;

determining that the ventilation system is operating during an un-occupancy time period; and in response to the first and second determining:

accessing thermostatic configuration data comprising a first time duration of the un-occupancy time period;

determining a pre-occupancy purge run time difference based on a difference between an occupancy ventilation run time and an un-occupancy ventilation run time and based on the first time duration of the un-occupancy time period;

combining the pre-occupancy purge run time difference to the un-occupancy ventilation run time to obtain the pre-occupancy purge run time; and activating the ventilation system for the pre-occupancy purge run time at an end of the un-occupancy time period.

16. The method of claim 15 further comprising:

when not during the pre-occupancy purge run time at the end of the un-occupancy time period, activating the ventilation system for the ventilation run time while a controlled heating/cooling system is running; and in a predetermined time period, when the ventilation run time is greater than a heating/cooling run time, activating the ventilation system for a remainder of the ventilation run time at a termination of the predetermined time period.

17. The method of claim 15 further comprising:

obtaining the mode indicator from the thermostatic configuration data.

18. The method of claim 15 further comprising:

obtaining the mode indicator through input data via a user interface.

19. The method of claim 15, wherein the pre-occupancy purge run time increases with the first time duration of the un-occupancy time period and the pre-occupancy purge run time is between the occupancy ventilation run time and the un-occupancy ventilation run time.

20. The method of claim 15 further comprising:

when the first time duration of the un-occupancy time period is greater than a first predetermined time duration, equating the first time duration of the un-occupancy time period to a first time constant; and when the first time duration of the un-occupancy time period is less than a second predetermined time duration, equating the first time duration of the un-occupancy time period to a second time constant.

\* \* \* \* \*